Nov. 10, 1942.   E. E. SEISS   2,301,714
DRY-BATTERY LAMP SHELL
Filed March 16, 1939

Inventor
Ernest E. Seiss
By Faust H. Crampton
Attorney

Patented Nov. 10, 1942

2,301,714

UNITED STATES PATENT OFFICE 2,301,714

DRY BATTERY LAMP SHELL

Ernest E. Seiss, Toledo, Ohio

Application March 16, 1939, Serial No. 262,156

1 Claim. (Cl. 220—1)

My invention has for its object to provide an efficient torpedo-shaped, dry-battery lamp shell formed from sheet metal and so constructed that it may be made at a low cost of production.

The invention provides a shell wall having integral tongue parts bent concavedly and welded together at their ends and a reinforcing bracket member welded to contiguous edge parts of the main wall part of the shell.

The invention may be contained in dry-battery lamp shells of different forms and, to illustrate a practical application of the invention, I have selected a battery lamp shell that contains the invention as illustrative of the various structures that may be contained in the invention. The battery lamp shell selected as an example is shown in the accompanying drawing.

Figure 1:
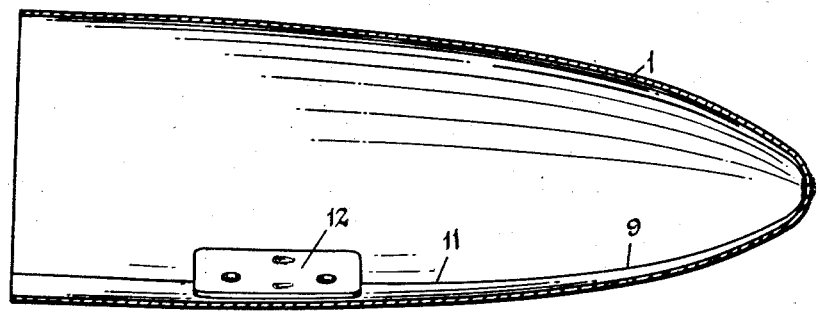
Figures 2, 3:
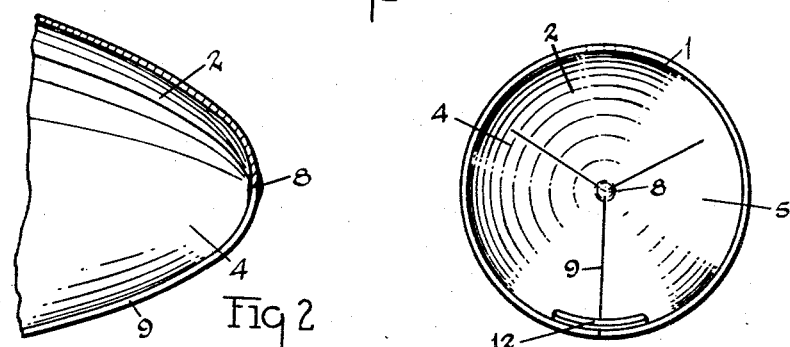
Figure 4:
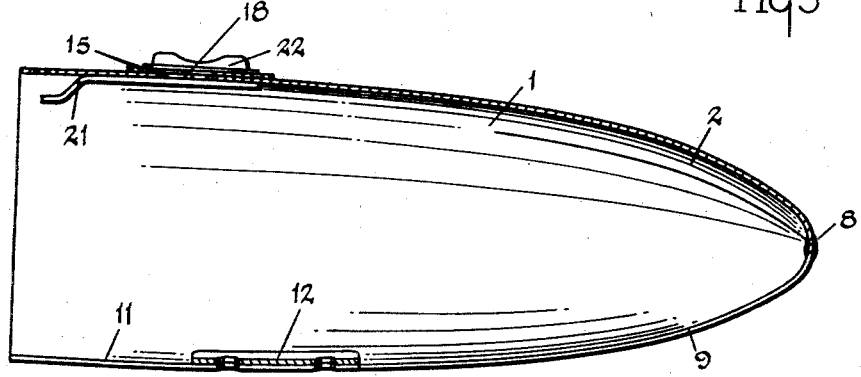

Fig. 1 illustrates a section of sheet metal when shaped into the form of the shell. Fig. 2 illustrates an enlarged section of the closed end of the shell. Fig. 3 is an end view of the shell. Fig. 4 illustrates a view of the longitudinal section of the shell.

The lamp shell 1 is provided with three tongues 2, 4, and 5 that are cut in semi-obovate form. When the main wall part of the shell is bent substantially cylindrical to locate the edges 11 of the main wall part 7 in contact with each other, the tongues 2, 4, and 5 are formed exteriorly convex or substantially semi-spoon shape to locate the edges 9 of the tongues in contact with each other to close one end of the shell. A small disk 8 is located at the juncture of the ends of the tongues and the ends of the tongues are spot-welded together and to the disk. In the weld, the heat softens the metal of the disk and shapes it to the interior surface of the shell at its point and thereby forms a reinforced point part, as well as to securely connect the tongues in position, notwithstanding the elasticity of the metal.

The contiguous side edges 9 of the tongues 4 and 5 form extensions of the side edges 11 of the body of the shell and the side edges 11 of the main wall part 7 of the shell are, also, secured in contact with each other by a bracket plate 12 welded to the surface of the shell and constitutes a reinforcement at the point of connection of the bracket to the lamp shell.

A slot 15 may be cut in the wall side opposite the location of the bracket plate and a slidable switch 21 and a finger part 22 may be connected together by a pin 18. The switch member 21 is located within the shell and when operated by movement of the finger part 23, connects the usual dry battery, formed of one or two cells, with a bulb, commonly used in dry-battery lamps.

Thus, by spot-welding the tips of the tongues and the plate 12 to the shell wall and subsequently buffing the shell, a rigid, attractive shell is readily formed at a low cost of production.

I claim:

In a dry battery lamp shell, the lamp shell comprising a main cylindrical sheet metal wall having two side edges in a common radial plane of the axis of the shell and one end edge in a plane at right angles to the axis of the shell; the wall having a plurality of tongues forming a serrated other end edge of the main wall and having inwardly concave spoon-shaped tips, and forming, when drawn edge to edge, a semi-ovate end of the shell; a disc located within the shell and welded to the inside surfaces of the tip ends of the tongues to secure the contiguous edges of the tongues in contact with each other and in planes extending radially from the axis of the shell, and maintain the rounded end of the ovate form; and a bracket plate welded to portions contiguous to the said two side edges of the main wall for securing the said two side edges of the main wall in contact with each other and for supporting the shell.

ERNEST E. SEISS.